Figure 1:
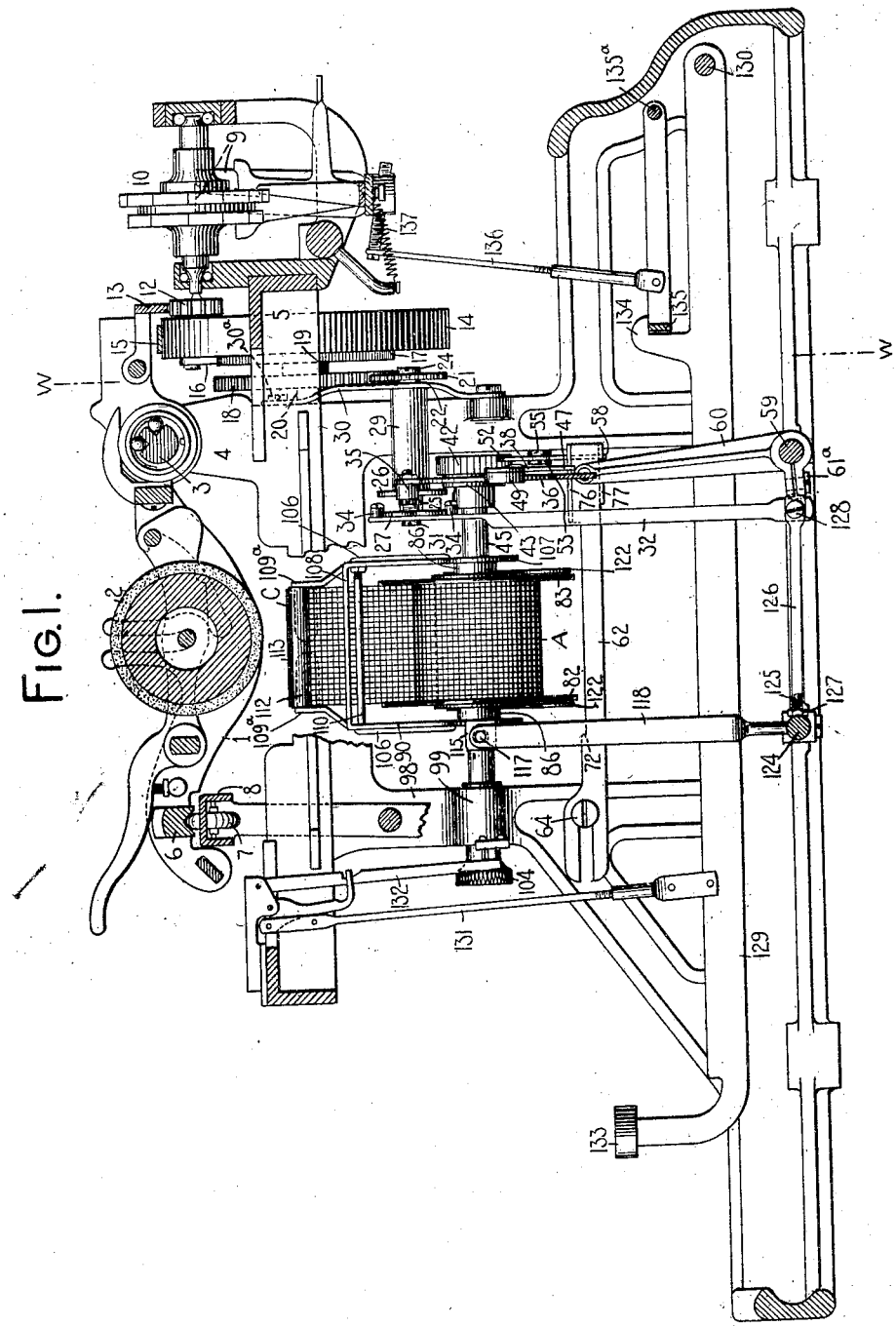

No. 877,541.

O. WOODWARD.
TYPE WRITING MACHINE.
APPLICATION FILED SEPT. 3, 1904.

PATENTED JAN. 28, 1908.

8 SHEETS—SHEET 1.

WITNESSES:
K. V. Donovan.
Charles E. Smith

INVENTOR:
Oscar Woodward
by Jacob Felbel
HIS ATTORNEY

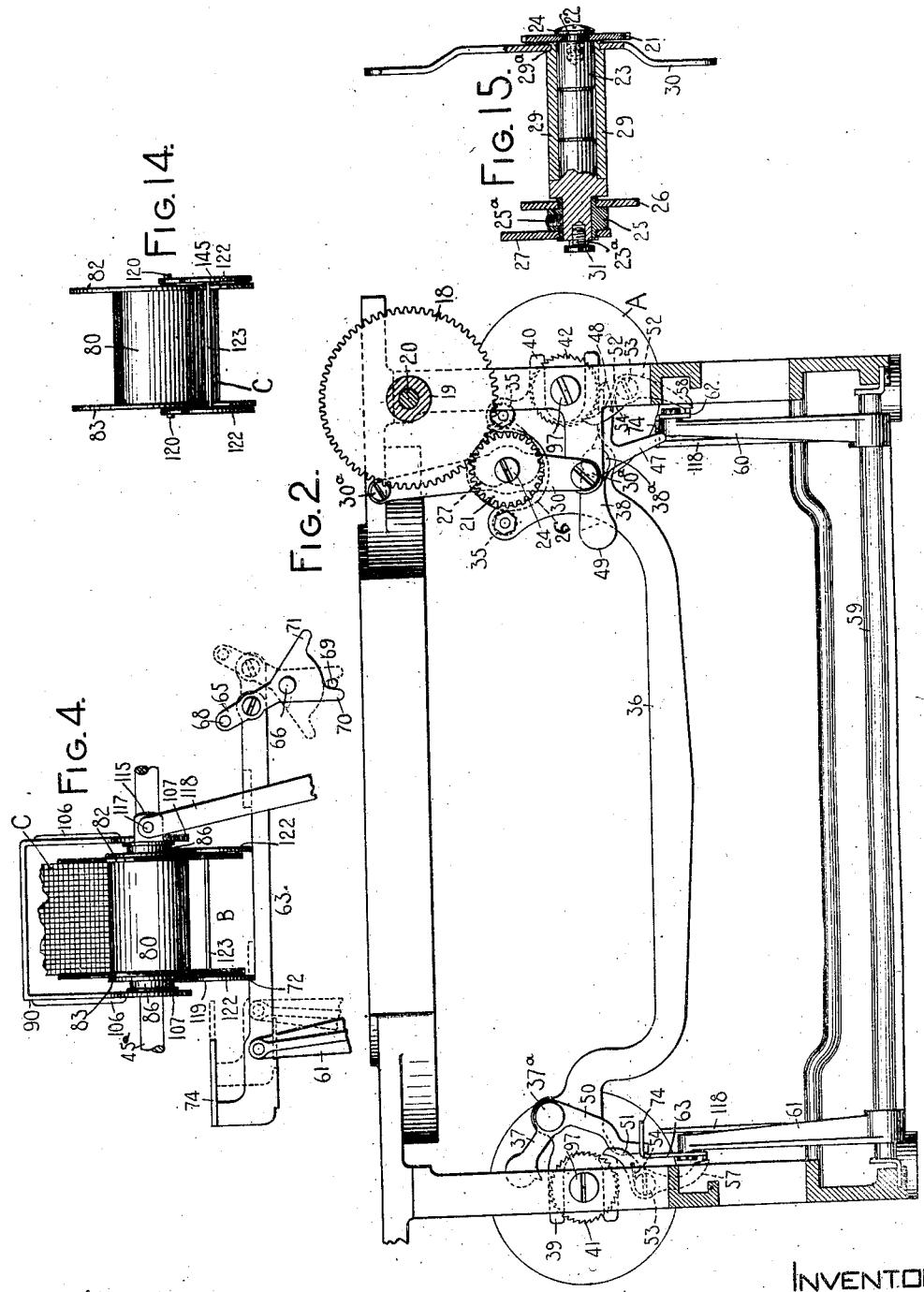

No. 877,541. PATENTED JAN. 28, 1908.
O. WOODWARD.
TYPE WRITING MACHINE.
APPLICATION FILED SEPT. 3, 1904.
8 SHEETS—SHEET 3.
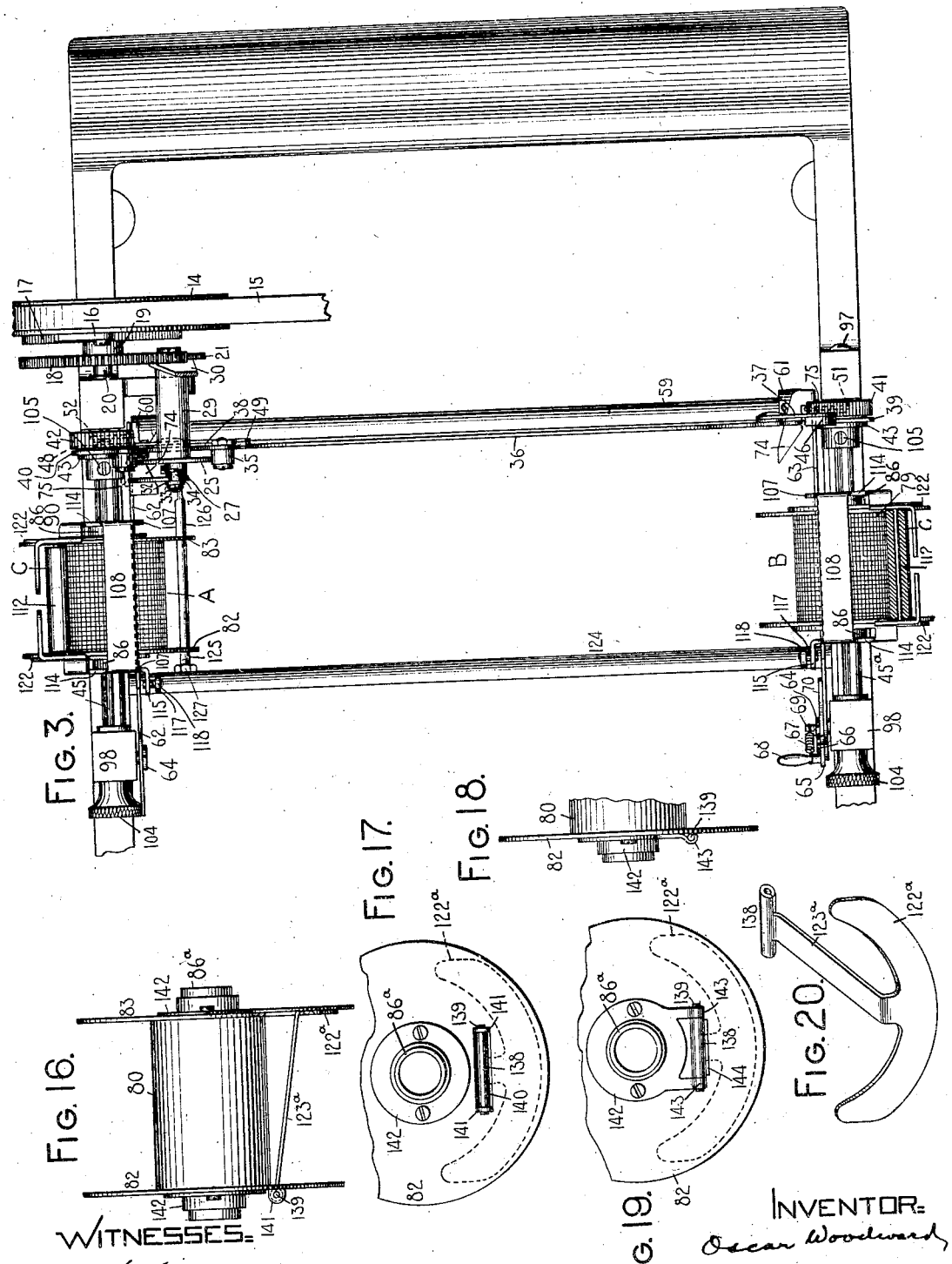

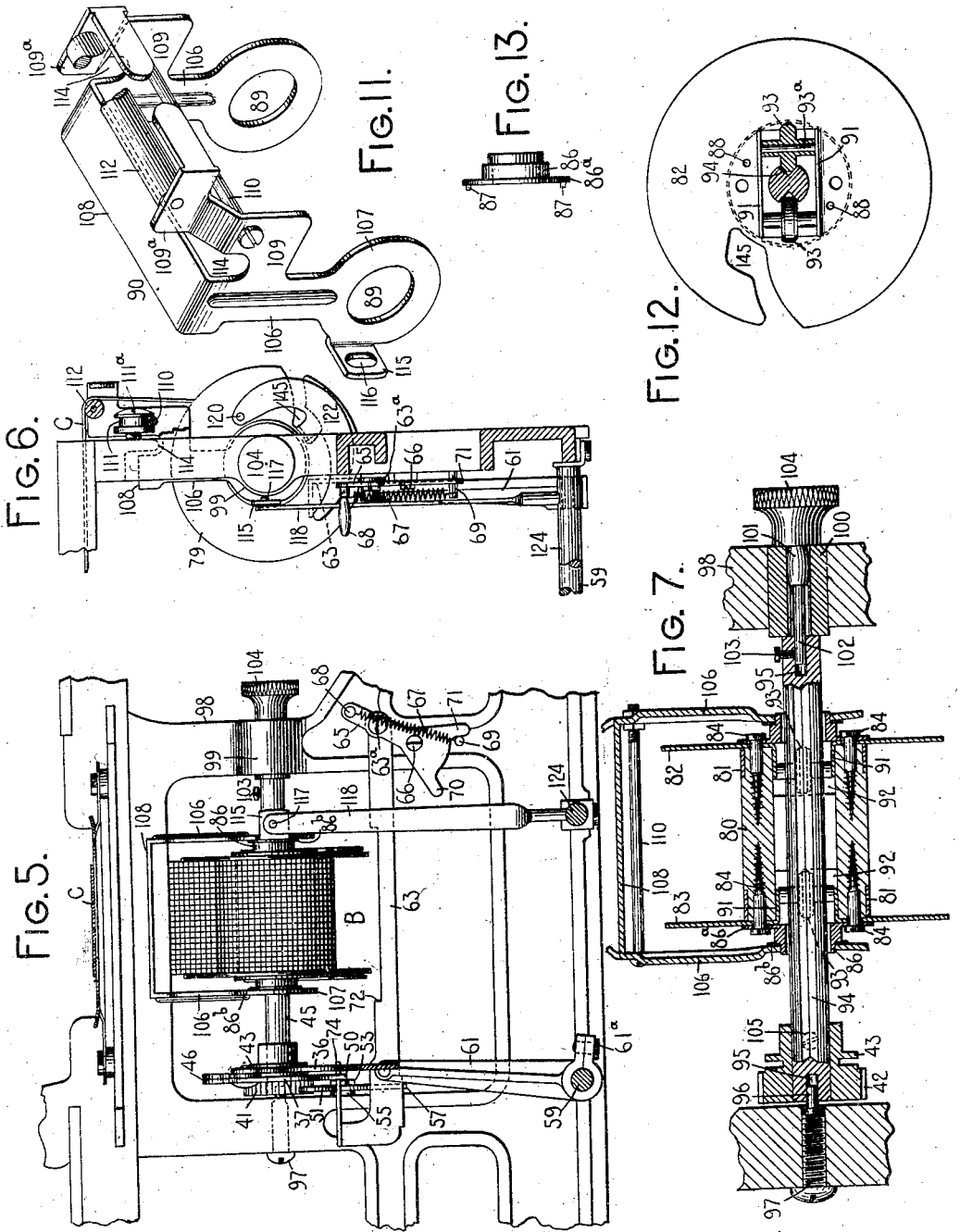

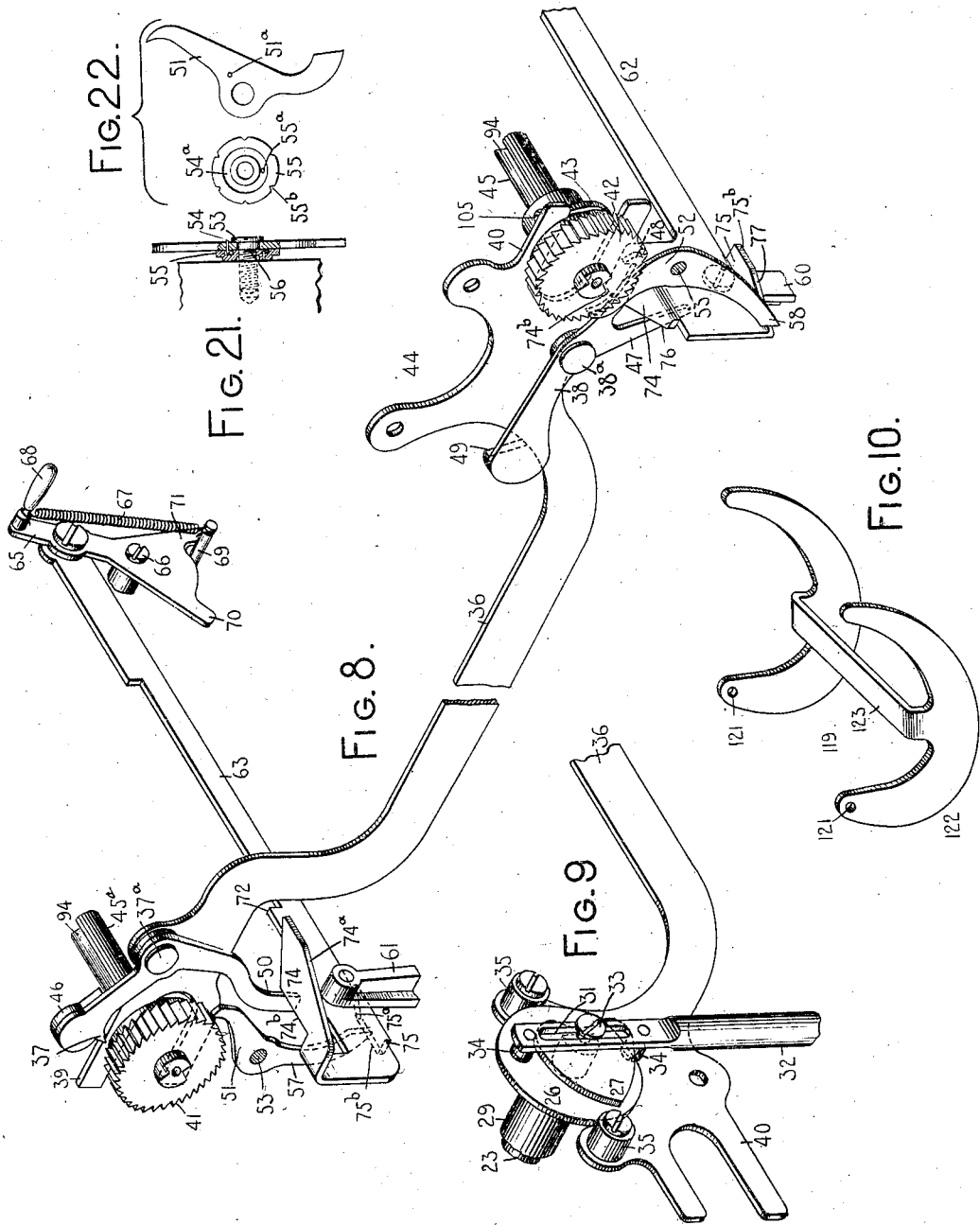

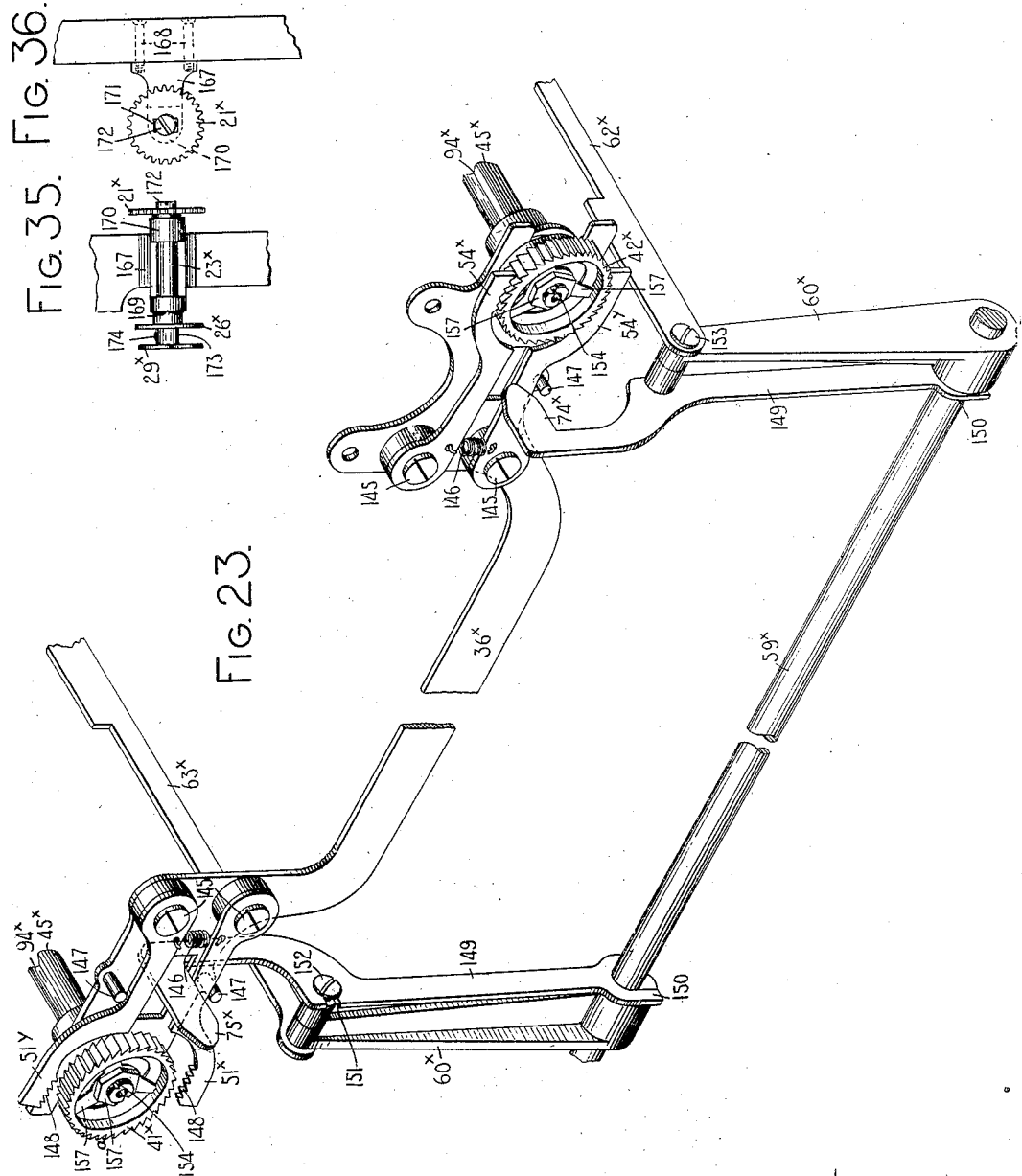

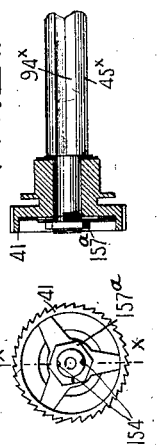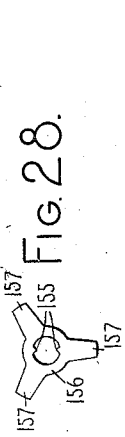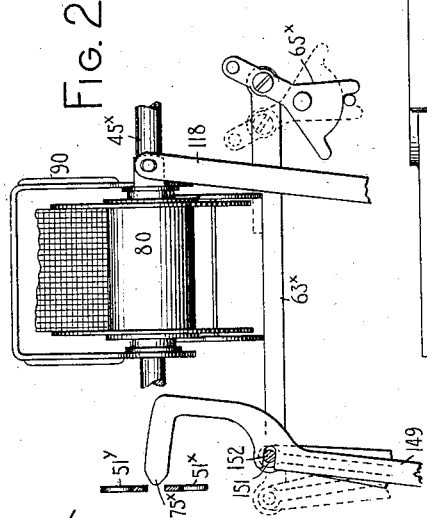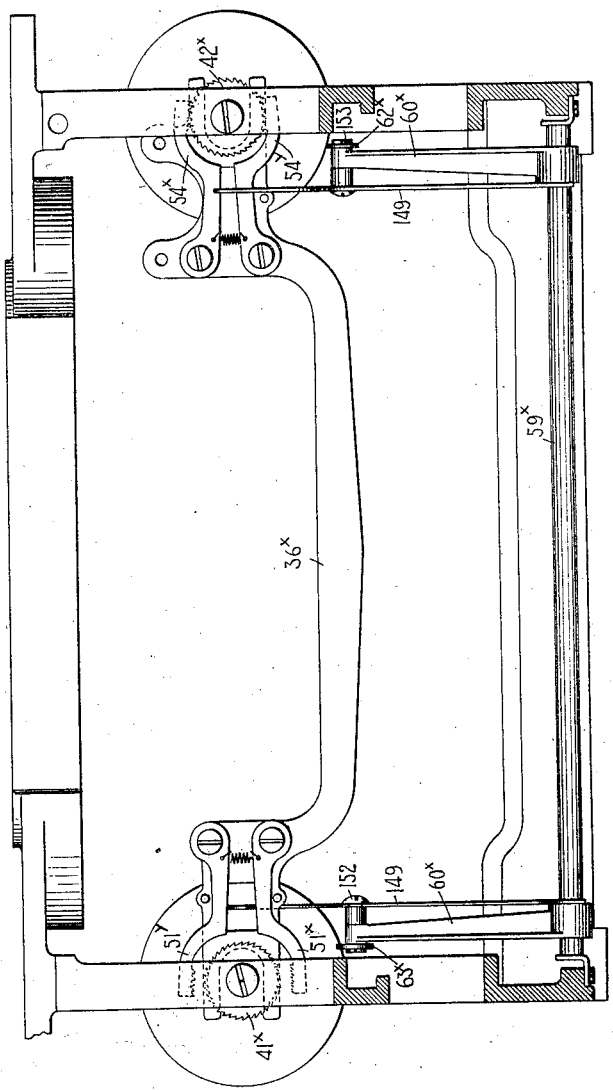

No. 877,541. PATENTED JAN. 28, 1908.
O. WOODWARD.
TYPE WRITING MACHINE.
APPLICATION FILED SEPT. 3, 1904.
8 SHEETS—SHEET 8.
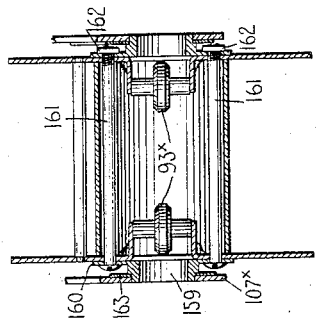
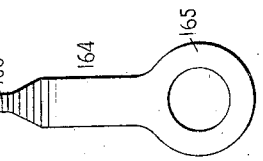
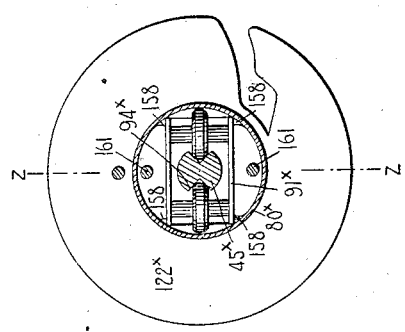
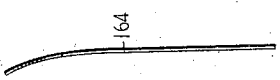
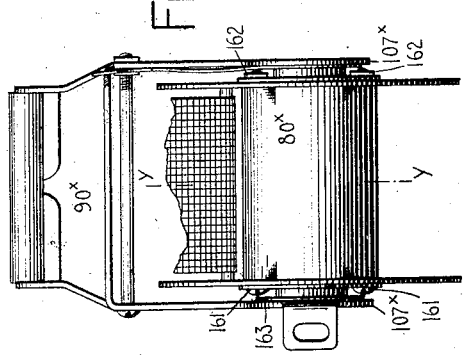
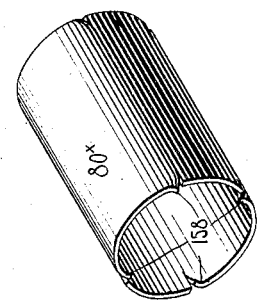
WITNESSES:
E. M. Wells.
Charles O. Smith.
INVENTOR:
Oscar Woodward
by Jacob Felbel
HIS ATTORNEY

UNITED STATES PATENT OFFICE.

OSCAR WOODWARD, OF NEW YORK, N. Y., ASSIGNOR TO UNION TYPEWRITER COMPANY, OF JERSEY CITY, NEW JERSEY, A CORPORATION OF NEW JERSEY.

TYPE-WRITING MACHINE.

No. 877,541.　　　Specification of Letters Patent.　　　Patented Jan. 28, 1908.

Application filed September 3, 1904. Serial No. 223,172.

*To all whom it may concern:*

Be it known that I, OSCAR WOODWARD, a citizen of the United States, and resident of the borough of Manhattan, city of New York, in the county of New York and State of New York, have invented certain new and useful Improvements in Type-Writing Machines, of which the following is a specification.

My invention relates to typewriting machines and more particularly to the ribbon feeding mechanism, one object of the invention being to provide comparatively simple and efficient mechanism for effecting an automatic reversal in the direction of the feed of the ribbon.

A further object of the invention is to provide comparatively simple and efficient mechanism for automatically feeding the ribbon in two directions at substantially right angles to each other.

To the above and other ends which will hereinafter appear, my invention consists in the features of construction and combinations of devices and arrangements of parts hereinafter more fully described and particularly pointed out in the appended claims.

In the accompanying drawings, wherein the same reference characters are used to designate the same parts in the various views, Figure 1 is a vertical front to rear central sectional view of a typewriting machine embodying my invention. Fig. 2 is a vertical transverse sectional view of the machine, the section being taken on the line *w—w*, Fig. 1, looking towards the front of the machine and with parts shown in Fig. 1 omitted. Fig. 3 is a horizontal section of the machine taken below the top plate and showing my improvements in plan. Fig. 4 is a fragmentary detail inner side view of a spool on its shaft, with part of the spool shifting lever and a portion of the reversing mechanism associated with said spool. Fig. 5 is a similar view to Fig. 4, the parts, however, occupying different positions. Fig. 6 is a front elevation of the right-hand end of the machine partly in section, the view being taken at a right angle to the position shown in Fig. 5. Fig. 7 is a longitudinal sectional view of the spool, its bearings and certain of the associated parts. Fig. 8 is an enlarged detail perspective view showing the relations of the dog carrying and ratchet actuating bar, the dogs, the ratchet wheels and the dog releasing bars with each other. Fig. 9 is an enlarged detail perspective view of the operating cams with the rollers and certain of the parts actuated by the cams. Fig. 10 is a perspective view of one of the operating latches carried by the spools. Fig. 11 is a perspective view of one of the spool shifting frames. Fig. 12 is a detail inner end elevation of one of the ribbon spools, with one of its bearing rollers and the spool shaft in section. Fig. 13 is a detail edge view of the collar secured to the outer face of the flange of the spool. Fig. 14 is a detail side view of a spool with its latch held up out of operation. Fig. 15 is a detail longitudinal sectional view of the bracket and sleeve carrying the shaft of the cams and their actuating pinion. Fig. 16 is a detail side view of a ribbon spool provided with a modified form of operating latch. Fig. 17 is a fragmentary end view of the same spool. Fig. 18 is a side view of one end of a spool showing modified means of hinging the operating latch. Fig. 19 is a fragmentary end view of the spool shown in Fig. 18. Fig. 20 is a detail perspective view of the operating latch shown in Figs. 16—19. Fig. 21 is an end view, partly in section, of one of the pawls for preventing a backward rotation of the ratchet wheels on the ribbon spool shafts, together with the means for mounting the same and adjusting the tension of the spring therefor. Fig. 22 shows detail face views of the pawl and washer shown in Fig. 21. Fig. 23 is a detail perspective view of another form of ribbon reversing mechanism. Fig. 24 is a detail rear elevation of the same. Fig. 25 is a detail side elevation of certain of the parts shown in Figs. 23 and 24. Fig. 26 is a detail end view showing another manner of connecting the ratchet wheels to the ribbon spool shafts. Fig. 27 is a detail longitudinal sectional view of the same taken on the line *x—x* of Fig. 26. Fig. 28 is a detail face view of the friction spring for connecting the ratchet wheel shown in Figs. 26 and 27 to the shaft. Fig. 29 is a detail side view of another form of ribbon spool and holder. Fig. 30 is a transverse sectional view of the ribbon spool shown in Fig. 29, the section being taken on the line *y—y* of Fig. 29. Fig. 31 is a longitudinal sectional view of the same taken on the line *z—z* of Fig. 30. Fig. 32 is a detail perspective view of a ribbon spool core of the character shown in Figs. 29 to 31. Figs. 33 and 34 are detail edge and face views respectively of a detent spring which coöperates with the ribbon spools; and Figs. 35 and 36 are detail side and end views respectively of another form of driving gear and connections for actuating the ribbon mechanism.

In the various views, parts have been omitted or broken away to better illustrate other features of the construction.

While I have shown my invention applied to a "Densmore" typewriting machine, it is obvious that the various features thereof may be applied to other characters of writing machines.

The machine will be seen to be provided with a carriage 1 and platen 2, the former supported at its rear by the traverse rod 3 secured to standards 4 rising from the top plate 5 of the machine, and the front track 6 of the carriage is supported by rollers 7 carried by the shift rail 8. The feed of the carriage is controlled by the dogs 9 and an escapement wheel 10 operatively connected to a feed pinion 12 which meshes in the feed rack 13. The carriage 1 is moved in the direction of its feed by a drum 14 containing a spring under tension, the spring having one of its ends made fast to the shaft or spindle 20 (Figs. 2 and 3) projecting from the frame of the machine and carrying the drum, whereas its other end is connected to the inside of the drum. A band 15 passes around the drum to which it is attached at one end, the other end of the band being connected to the carriage by means of a hook or other suitable device.

The spring drum 14 carries on its forward face a pawl 16 which engages a ratchet wheel 17 during the travel of the carriage from right to left or in the direction of its feed. This ratchet wheel 17, and a gear wheel 18 have a common hub 19 loosely rotating on the shaft 20 of the drum 14, so that when the drum is rotated by the spring during the feed movement of the carriage, the pawl 16 engages the teeth of the ratchet wheel and rotates it, together with the gear wheel 18, thus transmitting movement to the ribbon feed mechanism, as will hereinafter more clearly appear, but when the rotation of the drum is reversed by the return of the carriage to the right, the pawl rides freely around the teeth of the ratchet wheel and leaves it and the gear wheel 18 at rest, so that at this time no movement is transmitted to the ribbon feed mechanism, and as a consequence, no movement of the ribbon will take place and it will be fed only during the travel of the carriage in the direction of its feed, and therefore will be used uniformly. The rotation of the ratchet wheel 17 and gear 18 causes the rotation of a pinion 21, meshing with gear 18. This pinion 21, as shown in Fig. 15, is secured upon the rear reduced end 22 of a shaft 23 by a screw 24, or otherwise, and the forward end of the shaft is likewise reduced and receives a hub 25 that is secured in place upon the shaft by a set screw 25$^a$ received in a tapped opening in the sleeve and bearing at its inner end on the shaft. The sleeve 25 has reduced ends on which the cams 26 and 27 are seated, said cams being secured or riveted in place on the sleeve by turning or upsetting the ends of the sleeve. The shaft 23 freely rotates in a sleeve 29 riveted at 29$^a$ to a bracket plate 30 which is secured to the frame of the machine by screws 30$^a$, as shown in Fig. 2. The extreme forward end of the shaft 23 has a further reduced portion 23$^a$ (Fig. 15) that constitutes a guide and bearing stud that takes into an elongated opening or slot 31 in a rod 32 (Fig. 9), a set screw 33 with a large flat head taking in the end of the shaft 23 and preventing a lateral displacement of the slotted end of the rod from its guiding stud 23$^a$.

The rod 32 occupies a vertical position and the slot 31 permits a vertical movement of the same. Laterally projecting anti-friction rollers 34 are carried by the rod near each end of the slot and between them is contained the cam 27 which bears at opposite sides on the rollers and during the rotation of the cam causes the rod to rise and fall. This cam 27 is substantially heart-shaped but the cam 26 is practically oval and coöperates with anti-friction rollers 35 projecting laterally from a bar or carrier 36 near one end thereof. The bar 36 is provided with the dogs or pawls 37 and 38 pivoted thereto at 37$^a$ and 38$^a$ respectively, and which actuate ratchet wheels 41 and 42 to turn the ribbon spools. Upon reference to Figs. 8 and 9, it will be seen that the bar or carrier 36 extends from side to side of the machine and is provided with forked ends 39 and 40 which straddle the hubs of the ratchet-wheels 41 and 42 and are restrained from lateral play by the ratchet wheels and a collar or ring 43 forming part of each hub (Fig. 7). The end 40 of the bar or carrier 36 also has a fork 44 (Fig. 8) which straddles the sleeve 29 and whose jaws carry laterally projecting anti-friction rollers 35 which coöperate with the cam 26. The rotation of the cam 26 acting on the rollers 35 gives to the bar 36 a longitudinally reciprocating motion and causing one of the pawls thereon to engage and actuate one of the ratchet wheels 41 or 42, which in turn rotates the associated ribbon spool shaft 45 or 45$^a$ and turns the ribbon spool A or B that is mounted thereon to wind the ribbon on that spool and thus effect a longitudinal feed of the ribbon.

The ratchet wheels 41 and 42 are designed to be turned in opposite directions by their dogs and the dogs or pawls 37 and 38 are pivoted at different points on their respective ends of the carrier 36, the dog 37 working on the upper edge of its ratchet wheel and dog 38 on the lower edge of the associated ratchet wheel. Each dog is weighted to effect an engagement with its respective ratchet-wheel and the weight in each instance serves as a stop to limit the pivotal movement of the associated dog in one direction relatively to its carrier and so that the dogs will engage the ratchet wheels in a uniform manner and a uniform extent of rotation will be imparted thereto. The dog 37 is in the nature of a bell crank, weighted at its engaging end by the piece 46 which is adapted to rest on the upper jaw of the forked end 39 of the carrier, which limits the downward movement of the engaging end of the dog and maintains it in position where it will engage the proper tooth of the ratchet wheel 41, during the throw of the carrier and consequently will rotate the ratchet wheel the required distance. The dog 38 is practically a straight bar with a depending finger 47; the hooked end 48 of the dog engaging the ratchet-wheel 42 and being normally maintained in a position to engage the ratchet-wheel by a weight 49 at the other end of the dog. This weight 49 comes in contact with the carrier 36 as shown in Fig. 8, and regulates the point of engagement between the hooked end of the pawl and the ratchet wheel during the movement of the carrier 36 from left to right. The object of finger 47 and a finger 50 on dog 37 will be hereinafter described.

The ratchet wheels are held against backward rotation and the ribbon held taut by means of the dogs or pawls 51 and 52 carried by screw pivots 53 passing into the frame of the machine (see Figs. 21 and 22), and the dogs are each provided with a coiled spring 54 and a perforation 51$^a$ in which one end of the spring is seated. The spring is housed in the annular recess 54$^a$ of a washer 55 carried by the screw 53, but held firmly against the frame by the shoulder 56 of the screw, and the other end of the spring is seated in and held by a perforation 55$^a$ in the washer. When the screw 53 is slightly loosened, the washer may be turned around the stem of the screw 53 with a spanner wrench engaging the notches 55$^b$ in the periphery of the washer and the tension of the spring may thus be varied. The dogs 51 and 52 each has a depending finger 57 and 58 respectively by which they may be thrown out of engagement with their respective ratchet wheels, as will hereinafter more clearly appear.

Extending from side to side of the machine and journaled within the frame is a rock shaft 59 carrying near each end an upright bar or crank arm 60 and 61 clamped to the shaft by means of the screws 61$^a$. The upper ends of these crank arms 60 and 61 are pivoted to transverse dog releasing bars or devices 62 and 63 respectively, the forward end of bar 62 being slotted at its forward end where it is seated and adapted to slide on a set screw 64 while the forward end of bar 63 is pivoted at 63$^a$ to the upper end of a hand shifting lever 65 pivoted by the screw 66 to the right-hand end of the frame of the machine and provided with a contractile spring 67, secured at one end to the handle 68 and at the other end to a pin 69 on the frame. This lever has depending stops or fingers 70 and 71 that coöperate with the fixed pin 69 to limit the movement of the lever in opposite directions.

The handle 68 affords a shifting of the mechanism to provide for the reversal of the longitudinal feed of the ribbon by hand at any desired point and the disposition of the spring is such that it is moved to either side of the pivotal center of the lever 65 and assures a complete movement of the parts and retains them against accidental displacement and with either of the stops 70 or 71 in contact with the fixed stop 69. The two bars 62 and 63 are reduced or cut-away along their upper sides or otherwise formed so as to provide shoulders or abutments 72, whose object will be explained later, and at the rear of each bar are two cams 74 and 75, which are best shown in Fig. 8, and are fashioned into flanges turned at right angles to the bar; the cams 74 and 75 on the bar 63 having inclined faces 74$^a$ and 75$^a$ respectively formed thereon, the cam 74 being on the upper side while its cam 75 is on its lower edge and the former is adapted to engage the finger 50 of the ribbon feed dog 37 and throw the dog out of operation, while the latter is adapted to engage the finger 57 of the ribbon feed pawl or dog 51 and to remove the dog from engagement with the ratchet wheel 41; these two dogs or pawls being shown out of engagement in Fig. 8, and the spring of the shifting lever 65 holding them in that position with the tails of the pawls resting on the straight faces 74$^b$ and 75$^b$ respectively of the cams 74 and 75. At the other side of the machine the bar 62 is seen provided with cams 74 and 75 having inclined faces 76 and 77 respectively, the former of which engages the finger 47 of the feed pawl 38 and cam face 77 is adapted to bear upon the finger 58 of pawl 52, and thus move the hook or engaging nose thereof out of engagement with its associated ratchet wheel. The bar 62 is shown withdrawn, however, in Fig. 8 and the cam faces are not acting on the pawls and they are therefore engaging or adapted to engage the ratchet 42, and the pawl 38 operates to intermittently rotate the same when the cam 26 rotates and causes the reciprocating motion of the bar 36. The rotation of the shaft 45 in the manner described carries with it the spool A and the ribbon is wound thereon while the spool B and its ratchet being unrestrained, allows the ribbon to unwind at that end.

The construction and arrangement of the ribbon spools and their bearings are shown in Fig. 7, from an examination of which it will be understood that each spool comprises a wooden core 80, each end being reinforced by a metal band 81 and having the flanges 82 and 83 secured to its end faces by screws 84. These flanges have secured to them by the same screws 84 collars 86 whose attaching flanges 86$^a$ are provided with centering or positioning pins 87 (Fig. 13) to enter holes 88 (Fig. 12) in the large flanges 82 and 83 of each spool. The collars 86 are reduced at their outer ends to enter eyes 89 (Fig. 11) of a frame 90 and revolve freely therein. The reduced portion of the collar carries a washer 86$^b$ (Fig. 7), preferably of raw hide or some similar substance, between the hub or apertured portion of the frame 90 and the shoulder of the collar. The flanges 82 and 83 of each ribbon spool have laterally disposed ears or extensions 91 on their inner sides which fit within the socket 92 of the core 80 and carry rollers 93 mounted on pins 93$^a$, the rollers having beveled peripheries designed to run in V-shaped grooves 94 in opposite sides of the ribbon spool shafts 45 and 45$^a$. The ends of each ribbon spool shaft are bored as at 95 and at the rear side of the machine the reduced end 96 of a screw 97 enters the hole in the rear end of each shaft and forms the bearing for this end of the shaft, the screw 97 passing through an opening tapped for it in the rear upright of the frame of the machine. The front uprights 98 of the frame are enlarged as at 99 and have an opening at that point to receive a bushing 100 that forms the bearing for the enlarged portion 101 of a spindle 102 which enters the socket 95 in the front end of a ribbon spool shaft and is secured therein by the set screw 103. The outer end of the spindle 102 has a knurled head 104 for manually winding the ribbon when it is desired to do so and the inner ends of both shafts 45 and 45$^a$ have secured to them by set screws 105 the ratchet wheels 41 and 42 respectively, as hereinbefore stated.

Each frame 90 is supported by the collars 86 of the flanges 82 and 83 (illustrated in detail in Fig. 11) and consists of uprights or side pieces 106, whose lower ends terminate in the hubs 107 with the eyes 89 hereinbefore referred to, the upper ends of said side pieces being united by the cross-piece 108. Extensions 109 of the sides 106 carry a guide rod 110, which extends from one side to the other of the frame 90 and passes into the groove of a roller 111 (Fig. 6) journaled on a screw 111$^a$ passing into a threaded opening in the frame of the machine, and a ribbon bearing and guiding roller 112, over which the ribbon C passes after leaving the spool, is mounted between upwardly extending ears 109$^a$ that project upwardly from the extension 109. Cut-outs 114 are designed to receive the side flange of the top plate of the machine and allow the frame 90 to travel freely with its spool along the ribbon spool shaft, a rotation of the frame being prevented by the guide rod 110 and its antifriction roller 111. One of the hubs 107 of each frame 90 carries an ear 115 with a vertical slot 116 into which projects a stud 117 carried by the upper end of an oscillating crank arm.

In Fig. 10 an operating latch 119 is shown in detail. One of these latches is carried by each ribbon spool and may be connected to the flanges thereof by means of pivots 120, (Fig. 6) that are riveted to the flanges and pass loosely through the holes 121 in the ends of the crescent-shaped members or engaging blades 122; the two members being united by a cross-bar 123. Normally this latch occupies the position shown in Figs. 6 and 14 where the edges of members 122 conform to or are within the peripheries of flanges 82 and 83 and the cross-bar 123 fits against the upper or inner end of slots 145 in the flanges and against the core of the spool, being held in such position by the ribbon C wound upon the spool. When, however, the ribbon is fully unwound from the spool, the layers of ribbon no longer support the latch through the cross-bar 123 and it is allowed to drop, when the spool revolves, until the cross-bar reaches the lower side of the slots 145 and the edges of the crescent-shaped members drop into the position shown in Fig. 4, where they extend beyond the peripheries of the flanges of the spool and into the slot or depression in the bar 62 or 63 to a position where one of the flanges is adapted to engage the abutment 72 on the associated bar 62 or 63 during the axial movements of the spools along their shafts.

In the foregoing description of the ribbon spool and its adjuncts, I have referred, for the sake of clearness, to the construction on one side of the machine, but it will be understood, however, that the construction and operation of the corresponding parts on both sides of the machine are the same. There are also two crank arms 118, one at each side of the machine, but they are carried by a single rock shaft 124 journaled in the sides of the frame of the machine, and which is tapped near one end to receive the threaded end 125 of a crank arm 126, locked therein by the check-nut 127. The other end of the crank arm 126 is pivotally connected to the lower end of rod 32 by the screw 128 and a rocking motion is given to these parts by the rotation of the cam 27 and the vertical movement of the rod.

The feed of the carriage and rotation of the drum 14 is effected by the usual key levers 129 pivoted on the bar 130 at the rear of the machine and having a link 131, which connects it to the type bar 132. Each key lever has a finger key 133 and is provided with a hook 134 engaging the upper side of the universal bar 135 in the form of a yoke and pivoted to the frame of the machine at 135ª. A link 136 connects the universal bar to a crank arm 137 of a dog rocker, which carries the feed dogs 9, and as each hook 134 of the key levers 129 engages the universal bar, the downward pressure of any key 133 will depress the universal bar 135 and cause the dogs 9 to release the escapement wheel one tooth and consequent partial rotation of the pinion 12 and the movement of the carriage one letter space distance will be effected, through pressure of the spring drum.

With the forward rotation of the drum 14 thus effected, the pawl 16 carried by the drum 14 engages the ratchet wheel 17 and rotates it with the drum 14. The hub of the wheel 17 revolves freely on the shaft or spindle 20 and carries the gear wheel 18 through the same degree of rotation as the ratchet wheel 17. The gear wheel 18, meshing with the pinion 21, rotates it and imparts motion, through the shaft 23, to the cams 26 and 27, giving to the rod 32 its vertical motion which rocks the shaft 124, through the medium of the crank arm 126, and causing the bar 36 to reciprocate transversely of the machine by the action of the cam 27, to actuate one or the other of the ratchet wheels 41 or 42. When the parts are disposed, as shown in Fig. 8, the cam faces of the dog releasing bar 62 do not engage its dogs 38 and 52, and they are left free to operate the ratchet wheel 42 and with each complete movement of the bar 36, the dog 38 advances the ratchet wheel 42 and the dog 52 locks the same against backward rotation. The lower ends of dogs 37 and 51 are engaged by the cam faces 74 and 75 of the bar 63 and held out of action and consequently the ratchet wheel 41 is free to turn backward with its spool shaft 45ª and permit the unwinding of the spool B while the winding operation is being performed by the ratchet wheel 42. This winding continues until the ribbon on the spool B on shaft 45ª is about exhausted and releases the cross-bar 123 of the operating latch 119 when the free ends or segment members drop upon the bar 63. During this longitudinal feed of the ribbon from one spool to another, the spools are undergoing a constant reciprocating or axial movement on the shafts 45 and 45ª while the carriage of the machine is moving forward, and this motion is brought about by the cam 27 acting upon the anti-friction rollers of the rod 32 and giving the latter its up and down motion and rocking the shaft 124. This movement to the shaft 124 causes the levers 118 to rock and, being connected to the frames 90 of the spools, cause them to move along the shafts 45 and 45ª. The total weight of the spools and frames is carried by the rollers 93, and the free movement of the collars 86 in the eyes 89 of the frame 90 permit the rotation of the spools and shafts while the lateral movement continues. It will be observed that the winding and unwinding of the spools also continue during the shifting of the same and allows the eventual presentation of every point in the length and breadth of the ribbon to the face of the types; securing an even wear to the fabric and gradual and complete utilization of the ink in the ribbon and consequently an even and uniform imprint on the paper.

The cross arm 123 of each latch is held against the core of the spool by the ribbon thereof when the spool is wound with its supply, but when this supply becomes exhausted by the unwinding of the spool, the latches are released and the weight of the free ends of the crescent-shaped members 122 cause them to drop upon the adjacent dog-releasing bar 62 or 63. The axial movement of the spools eventually carries this latch against the coöperating shoulders 72, thus moving the bar in the direction in which the spools are receiving their axial movement. It should be understood that a single shoulder or abutment 72 on each bar 62 or 63 is effective for coöperation with a latch of an associated spool, the bar 62 always being moved towards the front of the machine by the contact of the latch of the associated spool with the abutment 72 near the forward part thereof, whereas the bar 63 is always moved towards the rear of the machine by the coöperation of the latch of the associated ribbon spool with the abutment 72 near the rear of the bar. In Fig. 4 the position of the parts is shown when a latch 119 has engaged the shoulder or abutment 72 near the rear end of the bar 63 and thrown the same to its limit of movement in that direction, so as to release the dogs 37 and 51 and permit them to engage the ratchet wheel 41 and start the winding operation on the spool at that end of the machine, thereby automatically reversing the direction of longitudinal feed of the ribbon. The movement of the bar 63 just described effects a corresponding movement of the bar 62 by reason of crank arms 60 and 61 and rock shaft 59 which unite the two, so that when the bar 63 is moved to permit an engagement of the pawls 37 and 51 with the ratchet wheel 41, the pawls 38 and 52 are simultaneously disengaged by the movement of the bar 62 and the cams thereon, thus affording a free backward or unwinding movement of the associated ribbon spool. With the first rotation of the spool by the now operative ratchet wheel 41, the latch will, when it arrives uppermost, drop to a position where the segmental members will be within the peripheries of the flanges of the spool and the cross-bar 123 of the latch will be against the core and the layer of ribbon first gathered upon the core, catches the cross arm 123 and holds the latch 119 in its normal position, leaving the bar 63 free from further interference until the ribbon is unwound from this same spool. The segmental form of the engaging member of each latch enables it to maintain its engagement with an abutment 72 during about one-third of a revolution of the spool which carries it, so that there is no liability of the latch being carried around with the spool and out of engagement with the abutment before a complete throw of the releasing bar has taken place.

The movement of the bar 63 in one direction or the other effects a rocking of the locking lever 65 on its pivot and the tension of the associated spring tends to assure a complete movement of the parts and to maintain them in such position after they are moved. In Fig. 4 the lever is shown in full lines as being in a position releasing the dogs controlled by the bar 63, while the dotted line position indicates that which it assumes when the dogs are released. This lever, as heretofore stated, affords hand operated means for reversing the ribbon at any desired point and the knobs 104 on the spool shafts afford means for winding the ribbon of the spool whose ratchet is in operation when it is desired to effect such operation by hand. The frames 90, moving with the spools, carries and guides the ribbon from one spool to the other over the type-well by means of the rollers 112. The employment of grooves along the two sides of each spool shaft and the rollers on the spool for travel therein affords a ready and easy movement of the spools along the shafts; at the same time holding the spool against rotation thereon. The use of the reduced bearings 96 and 101 is also intended to reduce friction to a minimum.

Figs. 16 to 20 illustrate modifications of the operating latches already shown and described and in each of which the latch is shown composed of the single crescent-shaped member 122a with its cross piece 123a provided at its other end with an elongated sleeve 138 for the reception of the pivot pin 139 which hinges it to the flange 82 of the spool. This flange as shown in Fig. 17 has an elongated slot 140 having at each end ears 141 at right angles to the side of the flange and which carry the pivot pin 139. In Figs. 18 and 19 the flange 142 of the collar 86a has ears extending therefrom and which are adapted to carry the pivotal pins 139, and the flange 83 of the spool has a slot 144 between these ears and through which the cross piece 123a projects and in which it swings. This form of latch is adapted to operate in connection with the abutment or shoulder on the releasing bar and shove the same in in the manner hereinbefore described, each latch throwing in its own dogs, which movement throws out the other dogs. Its operation is the same as previously described, it being dropped by the exhaustion of the ribbon and returned when the winding operation starts and is held in the normal position by the ribbon.

The construction and manner of mounting the operating latches, shown more particularly in Figs. 16 to 20, is such that no part of a latch bears or rubs against the spool in the movement of the latch to or from the operative position; the latch being wholly supported and guided in such movements by the pivot thereof, and consequently the latches are very sensitive and will readily drop to the operative position and there is little liability of a latch sticking, as in certain constructions heretofore devised, with the result that the reversal in the feed of the ribbon would not be effected. By reason of the fact that each latch gives the thrust of its releasing bar in but one direction, it will be understood that segmental flanges or members of the latches are consequently carried by opposite flanges of the two spools; one always throwing the releasing bars forwardly and the other rearwardly, and the effective action of each latch being in but one direction.

In the arrangement and disposition of my improvements it will be seen that the ribbon is automatically fed longitudinally and transversely of its length and that the direction of the feed is automatically reversed without in any way interfering with or impeding the operation of the type actions or other parts; the actuating power being derived entirely from the spring drum at each step-by-step feed movement of the carriage. Nor does the application of my improvements require material alteration of the structural features of the typewriting machine, as such. It will likewise be seen that the ribbon reversing mechanism is actuated without bringing any strain upon the ribbon itself to effect such actuation and that when one feed dog is rendered operative to turn a ribbon spool, the other feed dog, by the same movements of the parts, is rendered inoperative and that consequently there is no arrest of the ribbon during the reversing action, which would enable two or more types to strike at the same point on the ribbon; that I have provided an efficient ribbon feed mechanism by means of which the ribbon is fed longitudinally and transversely; that the direction of longitudinal feed is automatically reversed when an end of the ribbon is approached, and that a new point on the ribbon is presented to the action of the types at each step-by-step feed movement of the carriage.

In Figs. 23, 24 and 25 I have shown another form of ribbon reversing mechanism wherein the bar or frame $36^x$ is similar to the part 36 previously described and which is actuated in the same manner. At each end of the frame or bar 36ˣ are two pawls 51ˣ, 51ʸ, 54ˣ and 54ʸ which are pivoted to the bar at 145 and are drawn towards each other by contractile springs 146 each connected at its ends to said pawls and pins 147 prevent accidental overthrow of the pawls. Each pair of the pawls are situated upon opposite sides of the ratchet wheels 41ˣ and 42ˣ and have ratchet teeth 148 which extend in opposite direction so that either one of each pair of pawls may properly coöperate with the associated ratchet wheel when the bar 36ˣ is moved in either direction. It will be understood that the pair of pawls at one side of the machine will be maintained in operative engagement with the associated ratchet wheel when the pair at the opposite side of the machine are maintained out of such engagement. Thus, the cam fingers 74ˣ and 75ˣ are situated at opposite ends of the machine and extend in opposite directions from upwardly projecting arms 149. These arms have their lower ends bifurcated at 150 where they are seated on the rock shaft 59ˣ and each arm has an open slot 151 therein where it is adapted to receive the stem of a headed set screw 152 which takes into a threaded opening in a crank arm 60ˣ that is fixed to the rock shaft 59ˣ. The screws 152 form means for connecting the arms 149 to the crank arms 60ˣ so as to move therewith and also constitute means for affording an adjustment of the arms 149 relatively to the crank arms on the shaft, so as to regulate or time the release or reëngagement of the pawls for turning the ribbon spool shafts. Bars 62ˣ and 63ˣ similar to the bars 62 and 63 hereinbefore described are pivotally connected at 153 to the crank arms 60ˣ and are actuated by the latches on the ribbon spools in the same general manner as hereinbefore described, and one of the bars is connected to the hand operated shifting lever 65ˣ constructed and operating in the same manner as the shifting lever 65 previously described.

In the modified form of construction just described the ratchet wheels 41ˣ and 42ˣ, instead of being secured rigidly to their shafts 45ˣ, as in the construction previously described, are connected thereto by friction devices in order to avoid liability of injury to the parts in the event of the reversing devices failing to work for any reason and so as to render unnecessary a nice timing or regulation of the parts. Thus, each ribbon spool shaft 45ˣ is grooved in opposite sides at the rear end thereof, as indicated at 154, to receive the inwardly extending projections 155 (see Fig. 28) of the friction device 156, that is centrally apertured to receive the associated shaft and has spring arms 157 which are adapted to bear with a spring pressure on the rear face of the associated ratchet wheel 41ˣ or 42ˣ loosely mounted on its shaft. A nut 157ᵃ is received on the rear end of each shaft to hold the friction device from displacement therefrom and to vary the tension exerted by said friction device. This construction establishes a frictional connection between each ratchet wheel and its shaft and is sufficient under ordinary conditions to cause a shaft to rotate with its ratchet wheel, but affords a rotation of a ratchet wheel independently of its shaft when undue resistance is offered to a turning of either ribbon spool.

Each ribbon spool shaft 45ˣ is grooved throughout substantially the entire length thereof, as indicated at 94ˣ, for coöperation with anti-friction rollers 93ˣ. Referring especially to Figs. 29 to 34, it will be seen that a modified form of spool construction is shown wherein the rollers 93ˣ are journaled in inwardly extending ears 91ˣ that are formed and project from the heads or flanges of the ribbon spools. These ears with their bearing rollers may be inserted endwise from opposite directions into a hollow sheet metal core 80ˣ provided with inwardly projecting lugs 158 formed from the ends of the core and bearing upon opposite sides of the ears 91ˣ when the latter are in place in the core to prevent the core from turning on the ears and to cause it to rotate with the ears and flanges from which latter the ears are formed. Bearing sleeves 159 have flanges 160 and reduced ends which take into the bearing openings formed in the hubs 107ˣ of the spool frames 90ˣ. Headed rods 161 pass through the flanges 160 on the sleeves, through the heads of the ribbon spools, and through the core and are secured by nuts 162, thus firmly uniting the different parts of the spool structure.

A washer 163 of leather or other suitable material is interposed between a hub 107ˣ on each spool frame and the shoulder formed at the junction of the reduced portion of the associated bearing sleeve 159 so that a frictional engagement may be maintained between each ribbon spool and the frame 90ˣ thereof that is fixed relatively to the rotation of the spool. At the opposite end of each spool is a leaf spring or friction device 164 shown in detail in Figs. 33 and 34. The lower end of this spring is formed with a hub 165 that encircles the reduced portion of the bearing sleeve 159 at that end of the spool where the spring is located and tends to move the ribbon spool axially in its frame so as to exert a pressure of the bearing sleeve at the opposite end of the sleeve on the washer 163 and to maintain a pressure of its own on the sleeve at the opposite end of the spool. The upper reduced end 166 of the spring passes through an opening in the spool frame provided for that purpose, in order to hold the upper end of the spring while its hub exerts a pressure on the spool and to prevent the spring from turning with the spool. The purpose of the brake springs is to prevent an over-rotation of either spool when the ribbon feed mechanism, (automatic or hand actuated) is violently actuated.

Referring especially to Figs. 35 and 36 it will be seen that a modified form of ribbon driving mechanism is shown wherein a bracket 167 is secured to a corner post of the frame of the machine by screws 168. This bracket is provided with bearing ears 169 and 170 for a shaft 23$^x$ that is enlarged at its right hand end in Fig. 35 to form a shoulder which abuts against the bearing 170 and limits the movement of the shaft in one direction. The enlargement on the shaft is squared at its end as indicated at 171 for coöperation with a coöperating opening in the driving gear 21$^x$. A headed screw 172 has its stem received in a threaded opening in the end of the shaft to secure the gear in place on the shaft. The opposite end of the shaft receives a hub 173 which carries the cams 26$^x$ and 27$^x$ that are secured thereto and the hub is secured in place on the shaft by a set screw 174 that is received within a threaded opening in the hub and bears at its inner end against the shaft, so that the gear, shaft, hub and cams are connected to rotate together and to transmit motion from the main driving gear 18 to ribbon feed and reversing mechanism. The construction shown in Figs. 35 and 36 is simple in construction and is stronger than the corresponding mechanism illustrated in Fig. 15, though in many respects essentially the same.

Certain of the features herein shown constitute no portion of my present invention and are not claimed herein but are included in applications previously filed by Walter J. Barron and Henry W. Merritt.

Various changes may be made without departing from the spirit of my invention and certain features may be employed without the others. Thus, for instance, from certain aspects of my invention, it is immaterial whether or not the ribbon receives an automatic transverse feed.

What I claim as new and desire to secure by Letters Patent, is:—

1. In a typewriting machine, the combination of a carriage, a carrier that is reciprocated transversely of the machine during the feed movement of the carriage, ribbon feed dogs actuated by said carrier, ribbon spools that are rotated by said dogs and means separate from the ribbon and operated by the power employed to move the carriage for automatically throwing one of said dogs into operation and the other out of operation when an end of the ribbon is approached.

2. In a typewriting machine, the combination of a carrier that extends from side to side of the machine and is reciprocated transversely thereof, ribbon feed dogs carried by said carrier, ribbon spools that are rotated by said dogs and receive axial movements, and means that are operated by the axial movements of the spools for automatically throwing one of said dogs into operation and the other out of operation when an end of the ribbon is approached.

3. In a typewriting machine, the combination of a carriage, ribbon spool shafts, ratchet wheels rigidly connected to said shafts, a carrier that is reciprocated by the power applied to move the carriage, ribbon feed pawls carried by said carrier and adapted to coöperate with said ratchet wheels, and means separate from the ribbon and controlled by the power employed to move the carriage for autmatically throwing one of said dogs into operation and the other out of operation when an end of the ribbon is approached.

4. In a typewriting machine, the combination of a carriage, ribbon spool shafts, axially movable ribbon spools carried thereby, means controlled by the power employed to move the carriage for effecting the axial movements of said ribbon spools, a ratchet wheel fixed to each ribbon spool shaft, a transversely reciprocating carrier, ribbon feed dogs carried by said carrier and one coöperating with each of said ratchet wheels, and means controlled by the axial movements of the ribbon spools for automatically effecting a disengagement of one feed dog with its ratchet wheel and effecting an engagement of the other feed dog with its ratchet wheel.

5. In a typewriting machine, the combination of a carriage, a spring drum therefor, cams rotated by said spring drum, ribbon spool shafts, axially movable ribbon spools carried thereby, means controlled by one of said cams for effecting an axial movement of said ribbon spools, a ratchet wheel fixed to each ribbon spool shaft, a reciprocating carrier actuated by the other of said cams, ribbon feed dogs carried by said carrier and one coöperating with each of said ratchet wheels, and means controlled by the axial movements of the ribbon spools for automatically effecting a disengagement of one feed dog with its ratchet wheel and effecting an engagement of the other feed dog with its ratchet wheel.

6. In a typewriting machine, the combination of a carriage, a cam that is rotated by the power applied to move the carriage, a bar that extends transversely of the machine and which is reciprocated by said cam, ribbon feed pawls that are carried by said bar, ratchet wheels with which said pawls coöperate, ribbon spool shafts to which said ratchet wheels are fixed, and means separate from the ribbon and controlled by the power applied to move the carriage for automatically effecting an engagement of one pawl with its ratchet wheel, and a disengagement of the other pawl with its ratchet wheel.

7. In a typewriting machine, the combination of a carriage, a reciprocating carrier that is operated by the power applied to move the carriage, ribbon feed pawls carried by said carrier, ratchet wheels with which the pawls coöperate, ribbon spools rotated by said ratchet wheels, reversing members carried by said ribbon spools, and cams that are automatically actuated by said members to afford an engagement of one feed pawl with its racthet wheel and to effect a disengagement of the other feed pawl with its ratchet wheel.

8. In a typewriting machine, the combination of a carriage, a reciprocating carrier that is operated by the power applied to move the carriage, ribbon feed pawls carried by said carrier, ratchet wheels with which the pawls coöperate, ribbon spools rotated by said ratchet wheels and which have automatic axial movements and cams that engage said pawls and are automatically actuated by the axial movements of the ribbon spools to afford an engagement of one feed pawl with its ratchet wheel and to effect a disengagement of the other feed pawl with its ratchet wheel.

9. In a typewriting machine, the combination of a carriage, ribbon spools, means for automatically effecting axial movements of said ribbon spools, a ratchet wheel for rotating each ribbon spool, pawls which actuate said ratchet wheels, reciprocating bars that are actuated by the axial movements of the ribbon spools, intermediate connections between said bars, and means carried by said bars for throwing one pawl out of engagement with its ratchet wheel and for affording a movement of the other pawl into an engagement with its ratchet wheel.

10. In a typewriting machine, the combination of a carriage, ribbon spools, means for automatically effecting axial movements of said ribbon spools by the power applied to move the carriage, a ratchet wheel for rotating each ribbon spool, pawls which actuate said ratchet wheels, a carrier that is reciprocated by the power that moves the carriage and which carries said pawls, reciprocating bars that are actuated by the axial movements of the ribbon spools, intermediate connections between said bars, and means carried by said bars for throwing one pawl out of engagement with its ratchet wheel and for affording a movement of the other pawl into engagement with its ratchet wheel.

11. In a typewriting machine, the combination of a carriage, a spring drum therefor, ribbon spools that are rotated and receive axial movements by the power applied from said spring drum, reciprocating pawls that rotate said spools, bars that are reciprocated endwise and fore and aft of the machine by the axial movements of said ribbon spools, and means carried by said bars for throwing one pawl out of operative position when the other pawl is in the operative position.

12. In a typewriting machine, the combination of a carriage, ribbon spools, ribbon spool shafts fixed against endwise movement, means for shifting the spools axially on the shafts, ratchet wheels fixed to the shafts, dogs alternately engaging the ratchet wheels and controlled by the axial movements of the spools on their shafts, means for reciprocating said dogs, and means for automatically operating the shifting devices and dogs, whereby the ribbon may receive a longitudinal and transverse feed, and the direction of the longitudinal feed may be automatically reversed when an end of the ribbon is approached.

13. In a typewriting machine, the combination of a carriage, ribbon spool shafts, spools adapted to move axially thereon while rotating, means for automatically effecting the axial motion of the ribbon spools, ratchet wheels on the ribbon spool shafts, dogs alternately engaging the ratchet wheels, and means controlled by the carriage moving means for operating the engaging dogs and moving the spools axially at each step-by-step feed movement of the carriage.

14. In a typewriting machine, the combination of a carriage, ribbon spool shafts, ribbon spools adapted to move axially on the shafts and rotate therewith, frames carried by the spools, means for moving the frames and causing the spools to shift in unison, ratchet wheels on the spool shafts, dogs that coöperate with said ratchet wheels, means for alternately affording an engagement of the dogs first with one ratchet wheel and then with the other, a reciprocating bar carrying the dogs, and means for actuating the reciprocating bar.

15. In a typewriting machine, the combination of a carriage, ribbon spools, shafts carrying the ribbon spools and affording axial movements of the spools thereon, oscillating arms operatively connected to the spools, ratchet wheels carried by said shafts, dogs adapted to alternately operate them, a reciprocating bar carrying the dogs, bars with cam faces for alternately releasing the dogs and holding them out of engagement with their ratchet wheels, means for automatically actuating said cam carrying bars, means for reciprocating the bar carrying the dogs, and means for operating the oscillating arms.

16. In a typewriting machine, the combination of a carriage, ribbon spool shafts, ratchet wheels on the shafts, dogs adapted to alternately engage the ratchet wheels, means for actuating the dogs, ribbon spools adapted to shift axially on the shafts, oscillating crank arms adapted to shift the spools, a rock shaft carrying the crank arms, a rocking arm for rocking the shaft, a rod carrying antifriction rollers and operating the rocking arm, and means for actuating the rod to shift the spools while they rotate with their shafts and while the shafts are being alternately driven by the dogs.

17. In a typewriting machine, the combination of a carriage, ribbon spool shafts, ribbon spools adapted to move axially of and rotate with their shafts, ratchet wheels connected to the shafts, dogs alternately actuating the ratchet wheels in different directions, a longitudinally reciprocating bar carrying the dogs, means for automatically reciprocating the bar, releasing bars with cam faces adapted to engage one set of dogs and release them from engagement with their respective ratchet wheel when the other set of dogs engage their ratchet wheel, and means for automatically actuating the releasing bars.

18. In a typewriting machine, the combination of a carriage, ribbon spool shafts, ribbon spools rotating with and receiving axial movements on their shafts, ratchet wheels connected to the shafts, dogs alternately actuating the ratchet wheels, a longitudinally reciprocating bar carrying the dogs which cooperate with the ratchet wheels, means for reciprocating the bar, releasing bars alternately engaging the dogs and rendering them inoperative, latches carried by the spools and automatically operating the releasing bars when an end of the ribbon is approached, and means for automatically shifting the spools axially while the carriage is being moved in the direction of its feed.

19. In a typewriting machine, the combination of a carriage, ribbon spool shafts, ribbon spools adapted to rotate with and to move axially on the shafts, ratchet wheels connected to the shafts, dogs alternately actuating the ratchet wheels, a bar carrying the dogs and reciprocating longitudinally, means for actuating the bar, releasing bars engaging the dogs, means for shifting the releasing bars in unison, latches carried by the spools and adapted to drop and automatically engage the releasing bars, hand operated means connected to the releasing bars for shifting them, and means for automatically effecting the axial movements of spools along their shafts.

20. In a typewriting machine, the combination of a carriage, ribbon spool shafts, ribbon spools rotating with and moving axially on the shafts, ratchet wheels fixed to the shafts, dogs alternately engaging the ratchet wheels, a bar carrying the dogs, means for operating the bar, releasing bars alternately engaging the operative dog and releasing the inoperative dog, rocking arms connected to the releasing bars, a rock shaft carrying the rocking arms and adapted to cause the releasing bars to shift in unison, means for rotating the ribbon spool shafts and for effecting axial movements of the spools, and means controlled by the axial movements of the spools for rocking said rock shaft.

21. In a typewriting machine, the combination of automatically shifted releasing bars, shoulders or abutments on the releasing bars, rocking levers connected to the releasing bars, a rock shaft journaled in the frame of the machine and having the rocking arms thereon, latches adapted to engage said shoulders or abutments, axially movable and rotating ribbon spools carrying the latches, means for automatically dropping a latch on a releasing bar when an end of the ribbon is approached, rotating shafts carrying the spools, ratchet wheels connected to the shafts, dogs alternately engaging the ratchet wheels and released therefrom by the releasing bars, a longitudinally reciprocating bar carrying the operating dogs, means for operating the reciprocating bar, and means for effecting the axial movements of the ribbon spools.

22. In a typewriting machine, the combination of ribbon spool shafts with longitudinal grooves, ribbon spools adapted to move axially on their shafts and rotate therewith, flanges for said spools provided with inwardly extending ears and anti-friction rollers that are journaled in said ears and take in the grooves in said shafts.

23. In a typewriting machine, the combination of a ribbon spool shaft, a ribbon spool that is adapted to move axially on its shaft, a guide frame for the spool, a grooved guide roller, and a coöperating guide rod which engages the groove in said roller and affords movements of the frame with the spool during the axial movements of the latter and prevents a swinging movement of the frame during the rotation of the spool.

24. In a typewriting machine, the combination of a ribbon spool shaft, a ribbon spool that rotates with said shaft and moves axially thereon, a frame that coöperates with said spool, a guide rod carried by the frame, a coöperating guide roller carried by a fixed portion of the machine and having a groove coöperating with said guide rod and adapted to guide the frame during the movement of the frame with the spool in its axial movement, and means for moving the frame to effect an axial movement of the spool.

25. In a typewriting machine, the combination of a ribbon spool shaft, a ribbon spool that rotates with said shaft and moves axially thereon, bearing rollers interposed between the spool and said shaft, a ribbon spool frame that is supported on bearings of the ribbon spool, a guide rod on said frame, and a relatively fixed grooved guide roller that coöperates with the guide rod.

26. In a typewriting machine, the combination of a carriage, ribbon spool shafts adapted to rotate in either direction, ribbon spools carried on the shafts and adapted to move axially thereon, latches carried by the spools, ratchet wheels connected to the shafts, dogs engaging the ratchets and alternately rotating the shafts in opposite directions, releasing bars controlling the engagement of the dogs with their ratchet wheels, a spring drum for moving the carriage and carrying a pawl, a main driving ratchet wheel actuated by the pawl when the carriage is moving in the direction of its feed, and mechanism controlled by the main ratchet wheel for actuating the dogs and shifting the spools axially during the feed movements of the carriage, and means for automatically releasing the latches and operating the releasing bars by the axial movements of the spools so that the direction of the rotation of the spools is automatically reversed.

27. In a typewriting machine, the combination of a carriage, ribbon spool shafts adapted to rotate in either direction, ratchet wheels for rotating said shafts, pawls therefor, means for automatically throwing the pawls into and out of coöperation with their ratchet wheels, so that the direction of the feed of the ribbon may be reversed when an end thereof is approached, ribbon spools rotating with and moving axially on their shafts, a spring feed drum, a main driving gear operated from said drum, a pinion meshing with the main driving gear, and cams adapted through suitable mechanism to reciprocate the pawls and to shift the spools axially along their shafts.

28. In a typewriting machine, the combination of a carriage, ribbon spool shafts, ratchet wheels connected thereto, ribbon spools, a carriage feed drum, a cam rotated by said drum, a reciprocating longitudinally movable bar that extends from side to side of the machine and is supported by the spool shafts and carries anti-friction rollers that are acted upon by said cam, feed pawls that are carried by said bar and coöperate with said ratchet wheels, and means for automatically throwing said pawls into and out of engagement with their ratchet wheels when an end of the ribbon is approached, in order to reverse the direction of feed thereof.

29. In a typewriting machine, the combination of a carriage, ribbon spools that are adapted to rotate and to receive axial movements, latches carried by said spools, ribbon spool shafts, thumb knobs carried by the shafts to turn the same by hand, ratchet wheels carried by the shafts, releasing bars with abutments adapted to be engaged by latches on the spools and to effect a movement of the bars by an axial shift of the ribbon spools, a hand actuated shifting lever controlling the releasing bars, dogs alternately actuating the ratchet wheels and thrown in and out of engagement therewith by the releasing bars, and means for automatically operating the dogs.

30. In a typewriting machine, the combination of a carriage, a spring feed drum, cams that are rotated by the spring drum during the feed movement of the carriage, a vertically moving rod with anti-friction rollers and actuated by one of the cams, a longitudinally reciprocating bar that extends from side to side of the machine and which is provided with anti-friction rollers actuated by the other cam, a dog near each end of said bar, ratchet wheels alternately operated by the dogs, spool shafts, ribbon spools adapted to move axially thereon, means controlled by the vertically moving rod for effecting the axial movements of the spools along their shafts, and means for automatically throwing one dog out of coöperation with its ratchet wheel when the other dog is in coöperative relation with its ratchet wheel.

31. In a typewriting machine, the combination of a carriage, a spring drum therefor, a longitudinally reciprocating bar that extends from side to side of the machine, means by which the drum actuates the reciprocating bar, dogs carried near each end of the bar, ratchet wheels alternately actuated by the dogs, spool shafts turned by said ratchet wheels, dogs pivoted to the frame of the machine, and which are adapted to coöperate with the ratchet wheels to prevent a backward rotation thereof, and means for automatically throwing the dogs of one ratchet wheel out of operation and for affording coöperation of the other set of dogs with their ratchet wheel.

32. In a typewriting machine, the combination of a carriage, a spring drum therefor, cams rotated by the spring drum, a longitudinally reciprocating bar which extends from side to side of the machine and is provided with anti-friction rollers upon which one of the cams bears, actuating dogs carried near each end of the bar, ratchet wheels fixed to the ribbon spool shafts, locking dogs pivoted to the frame of the machine and coöperating with the ratchet wheels, releasing bars with cam faces adapted to engage the dogs and throw one set out of engagement with the ratchet wheel thereof when the other dogs are moved into coöperation with the associated ratchet wheel, and means for automatically operating the releasing bars.

33. In a typewriting machine, the combination of ribbon spool shafts, ratchet wheels and collars thereon, a longitudinally reciprocating bar with forked ends straddling the shafts and held against lateral movement by the ratchet wheels and collars, dogs carried by the bar near the ends thereof and adapted to actuate the ratchets, means for reciprocating the bar, and means for rendering the dogs near either end of the bar inoperative to coöperate with the associated ratchet wheel when the dogs of the other ratchet wheel are adapted to coöperate therewith.

34. In a typewriting machine, the combination of a dog pivoted upon a shouldered screw, a washer carried by the screw and held against a relatively fixed portion of the machine, and a tension spring carried within a recess in the washer, having one of its ends attached to the dog and the other to the washer and adapted to have its tension increased by the rotation of the washer.

35. In a typewriting machine, the combination of a ribbon spool, a flange having a latch receiving slot with perforated ears at each side, a latch having a blade adapted to drop beyond the periphery of a flange of the spool and a cross piece adapted to be held against the core of the spool by the ribbon wound about it, a pivot bearing in said cross piece and a pivot pin that passes through said bearing and into the ears.

36. In a typewriting machine, the combination of a ribbon spool, flanges thereon, one of which has a slot, collars carried by the flanges, one of said collars having ears, and a latch with an engaging blade adapted to drop beyond the circumference of a flange of the ribbon spool and having a cross piece with an eye or pivot bearing at the one end, by means of which the cross piece after passing through the slot may be pivoted to the ears of the collar.

37. In a ribbon feed mechanism for typewriting machines, the combination of ribbon spool shafts, ratchet wheels therefor, pawls that are adapted to engage said ratchet wheels upon opposite sides thereof, a reciprocating carrier for said pawls, and means for automatically throwing said pawls into and out of engagement with their ratchet wheels.

38. In a ribbon feed mechanism for typewriting machines, the combination of ribbon spool shafts upon opposite sides of the machine, ratchet wheels fixed to said shafts, feed pawls that coöperate with the ratchet wheels and are adapted to engage the same upon opposite sides, and a reciprocating carrier that extends from side to side of the machine and carries said feed pawls.

39. In a ribbon feed mechanism for typewriting machines, the combination of ribbon spool shafts, ratchet wheels operatively connected to said shafts, pivoted weighted feed pawls that coöperate with the ratchet wheels, and a carrier for actuating said pawls and with which the weights on the pawls are adapted to abut to limit the pivotal movement of each feed pawl in one direction and normally arrest it in such position that it will properly engage its coöperating ratchet wheel.

40. In a typewriting machine, the combination of a ribbon spool, a frame therefor, a friction device at one end of the spool interposed between the spool and frame, and a spring at the other end of the spool for giving an axial thrust to the spool, to maintain the spool in frictional engagement with said friction device.

41. A ribbon spool comprising heads or flanges having inwardly projecting ears formed therefrom, and a hollow sheet metal core adapted to receive said ears, and having lugs formed therefrom which coöperate with the ears on the heads to connect the heads and core.

42. A ribbon spool comprising heads or flanges having inwardly projecting ears formed therefrom, a hollow sheet metal core adapted to receive said ears and having lugs formed therefrom which coöperate with the ears on the heads, to connect the heads and core, and tie rods or bolts that extend through the heads and hollow core and connect the heads together.

43. A ribbon spool comprising heads or flanges having inwardly projecting ears formed therefrom, anti-friction rollers journaled in said ears, and a hollow sheet metal core adapted to receive said ears and rollers, and having lugs formed therefrom which coöperate with the ears on the heads to connect the heads and core.

44. In a typewriting machine and ribbon feed mechanism, the combination of a ribbon spool shaft, a ribbon spool turned thereby, a wheel for turning said shaft, and means for effecting a frictional driving connection between said wheel and shaft said frictional driving connection being such as under ordinary conditions to cause the shaft to rotate with its driving wheel but to afford a rotation of the wheel independently of the shaft when undue resistance is offered to the turning of the ribbon spool.

45. In a typewriting machine and ribbon feed mechanism, the combination of a ribbon spool shaft, a ribbon spool turned thereby, a ratchet wheel carried by said shaft for turning it, and means for effecting a frictional driving connection between said ratchet wheel and shaft, said frictional driving connection being such as under ordinary conditions to cause the shaft to rotate with its driving wheel but to afford a rotation of the wheel independently of the shaft when undue resistance is offered to the turning of the ribbon spool.

46. In a typewriting machine and ribbon feed mechanism, the combination of a ribbon spool shaft, a ribbon spool carried by and turning with said shaft, a ratchet wheel carried by said shaft for turning it, and a friction device connected to the shaft for effecting a frictional driving connection between said ratchet wheel and shaft, said frictional driving connection being such as under ordinary conditions to cause the shaft to rotate with its driving wheel but to afford a rotation of the wheel independently of the shaft when undue resistance is offered to the turning of the ribbon spool.

47. In a typewriting machine and ribbon feed mechanism, the combination of a ribbon spool shaft, a ribbon spool turned thereby, a wheel carried by said shaft for turning it, and a spring plate connected to the shaft and bearing on said wheel to effect a frictional driving connection between the wheel and shaft, said frictional driving connection being such as under ordinary conditions to cause the shaft to rotate with its driving wheel but to afford a rotation of the wheel independently of the shaft when undue resistance is offered to the turning of the ribbon spool.

48. In a typewriting machine and ribbon feed mechanism, the combination of a ribbon spool, a ribbon spool shaft and means for turning said spool shaft, parts of said turning means being frictionally connected, the frictional driving connection being such as under ordinary conditions to cause the shaft to rotate with its driving wheel but to afford a rotation of the wheel independently of the shaft when undue resistance is offered to the turning of the ribbon spool.

49. In a typewriting machine, the combination of ribbon spools, means associated with each ribbon spool for turning it, controlling means for throwing the turning means for one spool out of operation when the other is thrown into operation, and means independent of the ribbon for adjusting said controlling means so as to time the throwing into and out of operation through said controlling means.

50. In a typewriting machine, the combination of ribbon spools, a ratchet wheel for each ribbon spool, a pawl for each ratchet wheel, controlling means for throwing one pawl out of operation when the other is thrown into operation, means for moving said controlling means, and means for effecting an adjustment of the controlling means relatively to the moving means therefor.

51. In a typewriting machine, the combination with ribbon spools and ribbon reversing mechanism, of coöperating gravity latches pivoted to said spools and wholly supported and guided in their movements to and from operative position by their pivots.

52. In a typewriting machine, the combination with ribbon spools and ribbon reversing mechanism, of coöperating gravity latches pivoted to said spools and free from contact with said spools during their movements of the latches to and from operative position and wholly supported and guided in such movements by their pivots.

53. In a typewriting machine, the combination of a ribbon spool, a ribbon spool shaft, means for turning said shaft, parts of said turning means being connected by frictional means, the frictional connection thus established between the parts being such as under ordinary conditions to cause the shaft to rotate with its turning means but to afford a movement of the turning means independently of said shaft, and means for varying the friction exerted by said frictional means.

Signed at the borough of Manhattan, city of New York, in the county of New York, and State of New York, this 2d day of September, A. D. 1904.

OSCAR WOODWARD.

Witnesses:
CHARLES E. SMITH,
E. M. WELLS.